(12) United States Patent
Ramasubramanian et al.

(10) Patent No.: US 9,753,120 B2
(45) Date of Patent: Sep. 5, 2017

(54) METHOD TO "ZOOM INTO" SPECIFIC OBJECTS OF INTEREST IN A RADAR

(71) Applicant: Texas Instruments Incorporated, Dallas, TX (US)

(72) Inventors: Karthik Ramasubramanian, Bangalore (IN); Sandeep Rao, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 331 days.

(21) Appl. No.: 14/521,325

(22) Filed: Oct. 22, 2014

(65) Prior Publication Data

US 2016/0116570 A1 Apr. 28, 2016

(51) Int. Cl.
| | | |
|---|---|---|
| *G01S 13/93* | (2006.01) | |
| *G01S 7/02* | (2006.01) | |
| *G01S 13/08* | (2006.01) | |
| *G01S 13/34* | (2006.01) | |
| *G01S 7/35* | (2006.01) | |
| *G01S 7/03* | (2006.01) | |

(52) U.S. Cl.
CPC ............ *G01S 7/02* (2013.01); *G01S 7/354* (2013.01); *G01S 13/08* (2013.01); *G01S 13/343* (2013.01); *G01S 13/931* (2013.01); *G01S 7/03* (2013.01); *G01S 2007/356* (2013.01)

(58) Field of Classification Search
CPC ............. G01S 7/02; G01S 7/354; G01S 13/08
USPC ................................................... 342/70, 118
See application file for complete search history.

(56) References Cited

U.S. PATENT DOCUMENTS

| | | | | |
|---|---|---|---|---|
| 5,963,163 A | * | 10/1999 | Kemkemian | ........... G01S 13/34 342/109 |
| 6,864,832 B2 | * | 3/2005 | Mende | ................... G01S 13/34 342/109 |
| 2009/0219190 A1 | * | 9/2009 | Lehre | ..................... G01S 7/352 342/71 |
| 2010/0277361 A1 | * | 11/2010 | Focke | .................. G01S 13/345 342/133 |

(Continued)

FOREIGN PATENT DOCUMENTS

| | | |
|---|---|---|
| WO | 2007029519 | 3/2007 |
| WO | 2014075838 A1 | 5/2014 |

OTHER PUBLICATIONS

International Search Report and Written Opinion for PCT/US2015/056968 mailed Feb. 4, 2016.

*Primary Examiner* — Marcus Windrich
(74) *Attorney, Agent, or Firm* — John R. Pessetto; Charles A. Brill; Frank D. Cimino

(57) ABSTRACT

The disclosure provides a radar apparatus fur estimating a distance of the one or more obstacles in a range of interest. The radar apparatus includes a local oscillator that generates a first ramp segment having a first start frequency. A frequency shifter receives the first ramp segment and generates a transmit signal and a mixer signal. The transmit signal is scattered by a one or more obstacles in the range of interest to generate the scattered signal. A mixer mixes the scattered signal and the mixer signal to generate a non-zero IF signal which is filtered to generate a filtered non-zero IF signal. An ADC (analog to digital converter) samples the filtered non-zero IF signal to generate a valid data. A DSP (digital signal processor) processes the valid data for estimating the distance of the one or more obstacles.

26 Claims, 4 Drawing Sheets

(56) References Cited

U.S. PATENT DOCUMENTS

2010/0289692 A1* 11/2010 Winkler ................ G01S 7/4008
                                                      342/70
2015/0378016 A1* 12/2015 Schoor ................ G01S 13/345
                                                      342/21

* cited by examiner

METHOD TO "ZOOM INTO" SPECIFIC OBJECTS OF INTEREST IN A RADAR

TECHNICAL FIELD

Embodiments of the disclosure relate generally to radars and more particularly to estimating distance of one or more obstacles using radars.

BACKGROUND

A vehicle has parking sensors to detect an obstacle behind the vehicle. The parking sensors determine a distance of the vehicle from the obstacle using ultrasonic signals when backing a vehicle. The parking sensor operates at ultrasonic frequencies. The parking sensor outputs an ultrasonic detecting signal to detect whether any obstacle is behind the rear of the vehicle and receives an ultrasonic signal as reply from the obstacle.

A vehicle generally requires multiple parking sensors to cover the entire rear of the vehicle which makes it a cost intensive solution. Also, the ultrasonic parking sensors use a time division obstacle detecting method in which each sensor sends and receive ultrasonic detect signal in a defined time slot. Thus, the process of detecting obstacles using ultrasonic sensors is time consuming which is unsafe in vehicles moving with high velocity.

Ultrasonic parking sensors require the measurement and drilling of boles in the vehicle's bumper to install transducers. There are risks associated with drilling and mounting the transducers into the bumper. The performance of the ultrasonic sensors is sensitive to temperature and atmospheric conditions such as snow and rain. The performance of ultrasonic sensors is severely degraded when the sensors are covered with snow. In addition, the distance over which the ultrasonic sensors operate is limited.

The use of radars in automotive applications is evolving rapidly. Radars do not have the drawbacks discussed above in the context of ultrasonic sensors. Radar finds use in number of applications associated with a vehicle such as collision warning, blind spot warning, lane change assist, parking assist and rear collision warning. Pulse radar and FMCW (Frequency Modulation Continuous Wave) radar are predominately used in such applications.

In the pulse radar, a signal in the shape of a pulse is transmitted from the radar at fixed intervals. The transmitted pulse is scattered by the obstacle. The scattered pulse is received by the radar and the time difference between the start of transmission of the pulse and the start of reception of the scattered pulse is proportional to a distance of the radar from the target. For better distance resolution, a narrower pulse is used which requires a high sampling rate in an ADC (analog to digital converter) used in the pulse radar. In addition, sensitivity of a pulse radar is directly proportional to the power which complicates the design of the pulse radar.

In an FMCW radar, a transmit signal is frequency modulated to generate a ramp segment. A plurality of obstacles scatters the ramp segment to generate a scattered signal. The scattered signal is received by the FMCW radar. A signal obtained by mixing the ramp segment and the scattered signal is termed as an IF (intermediate frequency) signal. The frequency (f) of the IF signal is proportional to the distance (d) of the obstacle from the FMCW radar and also to the slope (S) of the ramp segment.

Distance resolution defines the capability of the FMCW radar to resolve closely spaced objects or obstacles. For a given duration of the ramp segment, the distance resolution is directly proportional to the slope of the ramp segment. A maximum frequency of the IF signal is proportional to the product of the distance of a farthest obstacle which can be detected by the FMCW radar and the slope of the ramp segment. Further, a maximum measurable velocity of an obstacle by the FMCW radar is proportional to a repetition rate of the ramp segments in a frame which is dependent on the duration of each ramp segment.

The IF signal is sampled by an analog to digital converter (ADC). A sampling rate of the ADC is proportional to the maximum frequency of the filtered IF signal. Thus, if a large distance and a high resolution are required to be supported by the FMCW radar, it will require the maximum frequency of the IF signal to be higher and subsequently a higher sampling rate of the ADC. The high sampling rate of the ADC also increases the processing requirement of a DSP (digital signal processor) in the FMCW radar. Thus it would be useful to have techniques which can work with a limited IF bandwidth but yet allow the FMCW radar to detect one or more obstacles in the large distance and at the same time provide a high resolution.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An embodiment provides a radar apparatus. The radar apparatus includes a local oscillator that generates a first ramp segment having a first start frequency. A frequency shifter receives the first ramp segment and generates a transmit signal and a mixer signal. A transmit antenna is coupled to the frequency shifter and transmits the transmit signal. A receive antenna receives a scattered signal. The transmit signal is scattered by one or more obstacles in a range of interest to generate the scattered signal.

A mixer receives the scattered signal and the mixer signal. The mixer mixes the scattered signal and the mixer signal to generate a non-zero IF (intermediate frequency) signal. An IF filter is coupled to the mixer and generates a filtered non-zero IF signal from the non-zero IF signal. An ADC (analog to digital converter) is coupled to the IF filter and samples the filtered non-zero IF signal to generate a valid data. A DSP (digital signal processor) is coupled to the ADC, the local oscillator and the frequency shifter. The DSP processes the valid data for estimating a distance of the one or more obstacles in the range of interest.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
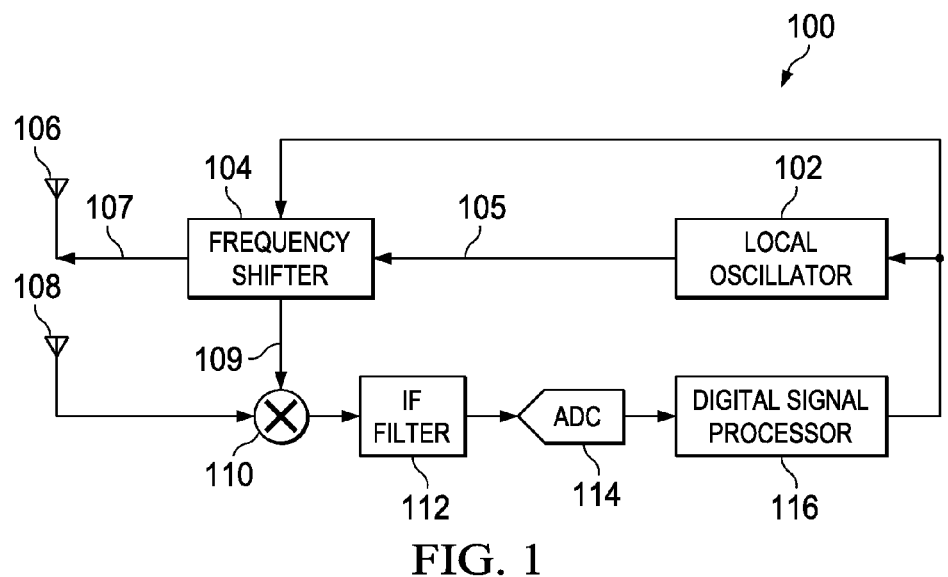
FIG. 1 illustrates a radar apparatus, according to an embodiment.

FIG. 1 illustrates a radar apparatus 100, according to an embodiment. The radar apparatus 100 includes a local oscillator 102. A frequency shifter 104 is coupled to the local oscillator 102 and a transmit antenna 106 is coupled to the frequency shifter 104. In one version, a power amplifier is coupled between the frequency shifter 104 and the transmit antenna 106. The radar apparatus 100 also includes a receive antenna 108. A mixer 110 is coupled to the receive antenna 108. In an example, a low noise amplifier is coupled between the receive antenna 108 and the mixer 110.

An IF (intermediate frequency) filter 112 is coupled to the mixer 110. An analog to digital converter (ADC) 114 is coupled to the IF filter 112. A DSP (digital signal processor) 116 is coupled to the ADC 114. The DSP 116 is also coupled to the local oscillator 102 and the frequency shifter 104. In one version, the radar apparatus includes a processor instead of (or in addition to) the DSP 116. The processor can be, for example, a CISC-type (Complex Instruction Set Computer) CPU, or a RISC type CPU (Reduced Instruction Set Computer). The radar apparatus 100 as illustrated has one transmit chain and one receive chain. The transmit chain includes the local oscillator 102, the frequency shifter 104 and the transmit antenna 106. The receive chain includes the receive antenna 108, the mixer 110, the IF filter 112, the ADC 114 and the DSP 116. It is understood that the radar apparatus 100 can include one or more transmit chains and one or more receive chains. Also, each of the chains can be real or complex. The radar apparatus 100 may include one or more additional components known to those skilled in the relevant art and are not discussed here for simplicity of the description.

The operation of the radar apparatus 100 illustrated in FIG. 1 is explained now. The radar apparatus is used for estimating a distance of one or more obstacles in a range of interest. A range of interest is a range of distances in which presence of obstacles is desired to be detected and estimated, The range of interest is defined as the range between a maximum distance ($d_{max1}$) and a minimum distance ($d_{min1}$). Thus, a length of the range of interest is:

$$R_i = d_{max1} - d_{min1} \quad (1)$$

In one example, the minimum distance ($d_{min1}$) is non-zero. The local oscillator 102 generates a first ramp segment 105 having a first start frequency. The first ramp segment 105 has a slope S1. The slope (S1) of the first ramp segment 105 is dependent on one or more of the following (but not limited to) the maximum distance ($d_{max1}$), the minimum distance ($d_{min1}$), a maximum sampling rate ($F_{adc\_max}$) of the ADC 114 and a maximum expected velocity of the one or more obstacles. In one example, the slope (S1) of the first ramp segment 105 is defined as (where c is the speed of light):

$$S1 = \frac{cF_{adc\_max}}{4(d_{max1} - d_{min1})} \quad (2)$$

In another example, the slope (S1) of the first ramp segment 105 is defined in the local oscillator 102 by the DSP 116. The frequency shifter 104 receives the first ramp segment 105 from the local oscillator 102. The frequency shifter 104 generates a transmit signal 107 and a mixer signal 109. The frequency shifter 104 provides a fixed frequency shift $\Delta f_{shift}$ to one of the transmit signal 107 and the mixer signal 109 based on the range of interest.

In a first version, the transmit signal 107 is a second ramp segment having a second start frequency and the mixer signal 109 is a ramp segment having the first start frequency. A difference between the second start frequency and the first start frequency is the fixed frequency shift $\Delta f_{shift}$. In a second version, the mixer signal 109 is a third ramp segment having a third start frequency and the transmit signal 107 is a ramp segment having the first start frequency. A difference between the third start frequency and the first start frequency is the fixed frequency shift $\Delta f_{shift}$. A slope of each of the first ramp segment 105, the second ramp segment and the third ramp segment are equal.

Thus, in the first version, the frequency shifter 104 applies the fixed frequency shift $\Delta f_{shift}$ to the first ramp segment 105 to obtain the transmit signal 107 and the mixer signal 109 is same as the first ramp segment 105. Also, in the second version, the frequency shifter 104 applies the fixed frequency shift $\Delta f_{shift}$ to the first ramp segment 105 to obtain the mixer signal 109 and the transmit signal 107 is same as the first ramp segment 105. Thus, only one of the mixer signal 109 and the transmit signal 107 is a frequency shifted version of the first ramp segment 105 generated by the local oscillator 102.

The fixed frequency shift $\Delta f_{shift}$, in one example, is obtained from the minimum distance $d_{min1}$. The fixed frequency shift $\Delta f_{shift}$, in another example, is obtained from the minimum distance $d_{min1}$ and the slope (S1) of the first ramp segment 105. An absolute value of the fixed frequency shift $\Delta f_{shift}$ is henceforth defined as:

$$\Delta f_{shift} = S1 * 2d_{min1}/c \quad (3)$$

where c is the speed of light.

In yet another example, the fixed frequency shift $\Delta f_{shift}$ is defined as $$\Delta f_{shift} = (S1 * 2d_{min1}/c) + \Delta f_{offset} \quad (4)$$

where, $\Delta f_{offset}$ is an additional frequency offset to account for the low frequency flicker noise region or any attenuation of the IF filter 112. The fixed frequency shift $\Delta f_{shift}$ is defined in the frequency shifter 104 by the DSP 116.

The transmit antenna 106 transmits the transmit signal 107. The transmit signal 107 is scattered by one or more obstacles in a range of interest to generate a scattered signal. The receive antenna 108 receives the scattered signal. The mixer 110 receives the scattered signal from the receive antenna 108 and receives the mixer signal 109 from the frequency shifter 104. The mixer 110 mixes the scattered signal and the mixer signal 109 to generate a nonzero IF (intermediate frequency) signal. The IF filter 112 receives the non-zero IF signal from the IF filter 112 and generates a filtered non-zero IF signal.

The ADC 114 samples the filtered non-zero IF signal to generate a valid data. The valid data corresponds to the first ramp segment 105. The DSP 116 processes the valid data for estimating a distance of the one or more obstacles in the range of interest. The DSP 116 performs frequency domain processing such as (but not limited to) fast Fourier transform (FIST) on the valid data. The DC (direct component) value of the frequency spectrum in the nonzero IF signal will correspond to the one or more obstacles located at the minimum distance $d_{min1}$.

The above mentioned process of the generating the first ramp segment 105 by the local oscillator 102 and processing by the DSP 116 to estimate a distance of the one or more obstacles in the range of interest; is referred to as a coarse detection process. Thus, in the coarse detection process, the radar apparatus 100 estimates a distance of the one or more obstacles in the range of interest and the range of interest is defined as the range between the maximum distance ($d_{max1}$) and the minimum distance ($d_{min1}$). After the coarse detection process, a zoom-in process is performed the radar apparatus 100 which is now described.

Based on the distance of the one or more obstacles estimated in the coarse detection step the DSP 116 determines a narrow range of interest. The narrow range of interest is within the range of interest. The narrow range of interest is defined as a range between a new maximum distance $d_{max2}$ and a new minimum distance $d_{min2}$. A length of the narrow range is defined as:

$$NR_i = d_{max2} - d_{min2} \quad (5)$$

In one example, the new maximum distance ($d_{max2}$) is less than the maximum distance ($d_{max1}$) and also, the new minimum distance ($d_{min2}$) is greater than the minimum distance ($d_{min1}$). The local oscillator 102 generates a fourth ramp segment having a fourth start frequency. The fourth ramp segment has a slope S2. An absolute value of the slope (S2) of the fourth ramp segment is greater than an absolute value of the slope (S1) of the first ramp segment 105. The slope (S2) of the fourth ramp segment is dependent on one or more of the following (but not limited to) the new maximum distance ($d_{max2}$), the new minimum distance ($d_{min2}$), a maximum sampling rate ($F_{adc\_max}$) of the ADC 114 and a maximum expected velocity of the one or more obstacles. In one example, the slope (S2) of the fourth ramp segment is defined as:

$$S2 = \frac{cF_{adc\_max}}{4(d_{max2} - d_{min2})} \quad (6)$$

where, c is the speed of light.

In another example, the slope (S2) of the fourth ramp segment is defined in the local oscillator 102 by the DSP 116. The frequency shifter 104 receives the fourth ramp segment from the local oscillator 102. The frequency shifter 104 generates a new transmit signal and a new mixer signal. The frequency shifter 104 provides a static frequency shift $\Delta fc_{shift}$ to one of the new transmit signal and the new mixer signal based on the narrow range of interest. An absolute value of the static frequency shift $\Delta fc_{shift}$ is greater than an absolute value of the fixed frequency shift $\Delta f_{shift}$.

In a first version, the new transmit signal is a fifth ramp segment having a fifth start frequency and the new mixer signal is a ramp segment having the fourth start frequency. A difference between the fifth start frequency and the fourth start frequency is the static frequency shift $\Delta fc_{shift}$. In a second version, the new mixer signal is a sixth ramp segment having a sixth start frequency and the new transmit signal is a ramp segment having the fourth start frequency. A difference between the sixth start frequency and the fourth start frequency is the static frequency shift $\Delta fc_{shift}$. A slope of each of the fourth ramp segment, the fifth ramp segment and the sixth ramp segment are equal.

Thus, in the first version, the frequency shifter 104 applies the static frequency shift $\Delta fc_{shift}$ to the fourth ramp segment to obtain the new transmit signal and the new mixer signal is same as the fourth ramp segment. Also, in the second version, the frequency shifter 104 applies the static frequency shift $\Delta fc_{shift}$ to the fourth ramp segment to obtain a new mixer signal and the new transmit signal is same as the fourth ramp segment. Thus, only one of the new mixer signal and the new transmit signal is a frequency shifted version of the fourth ramp segment generated by the local oscillator 102.

The static frequency shift $\Delta fc_{shift}$, in one example, is obtained from the new minimum distance $d_{min2}$. The static frequency shift $\Delta fc_{shift}$, in another example, is obtained from the new minimum distance $d_{min2}$ and the slope (S2) of the fourth ramp segment. An absolute value of the static frequency shift $\Delta fc_{shift}$ is henceforth defined as:

$$\Delta fc_{shift} = (S2 * 2 d_{min2})/c \quad (7)$$

where c is the speed of light.

The static frequency shift $\Delta fc_{shift}$, in one example, is defined in the frequency shifter 104 by the DSP 116. The transmit antenna 106 transmits the new transmit signal. The new transmit signal is scattered by the one or more obstacles to generate a new scattered signal. The receive antenna 108 receives the new scattered signal. The mixer 110 receives the new scattered signal from the receive antenna 108 and receives the new mixer signal from the frequency shifter 104. The mixer 110 mixes the new scattered signal and the new mixer signal to generate a new non-zero IF (intermediate frequency) signal. The IF filter 112 receives the new non-zero IF signal from the IF filter 112 and generates a new filtered non-zero IF signal.

The ADC 114 samples the new filtered non-zero IF signal to generate a new valid data. The new valid data corresponds to the fourth ramp segment. The DSP 116 processes the new valid data for estimating a distance of the one or more obstacles in the narrow range of interest. The DSP 116 performs frequency domain processing such as (but not limited to) fast Fourier transform (FFT) on the new valid data.

The above mentioned process of the generating the fourth ramp segment by the local oscillator 102 and processing by the DSP 116 to estimate a distance of the one or more obstacles in the narrow range of interest; is referred to as the zoom-in process. The coarse detection process along with the zoom-in process allows the radar apparatus 100 to view objects (or obstacles) in the narrow range of interest with high resolution.

The slope (S2) of the fourth ramp segment is greater than the slope (S1) of the first ramp segment 105. This allows viewing obstacles t in the narrow range of interest in high resolution. The high slope of the fourth ramp segment allows the generation of a high bandwidth ramp segment which increases a distance resolution of the radar apparatus 100. In one version, a time duration spanned by the fourth ramp segment is made equal to a time spanned by the first ramp segment 105, which ensures that a maximum measureable obstacle velocity is the same in both the coarse detection process and in the zoom-in process. When the new valid data is analyzed in the frequency domain by the DSP 116, the high slope of the fourth ramp segment ensures large frequency separation between closely spaced obstacles. This also mitigates an effect of an amplitude noise skirt of a large obstacle obstructing the detection of a weaker obstacle adjacent to the large obstacle.

Figure 2A:
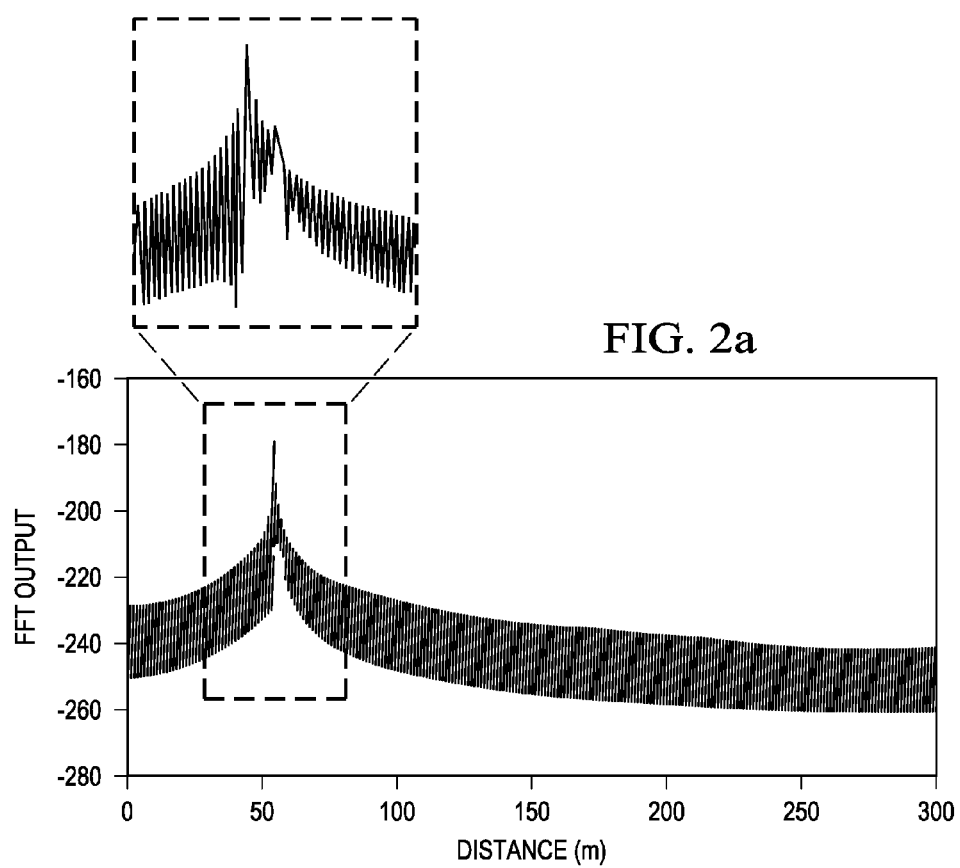
FIG. 2(a) is a waveform that illustrates an FFT (fast Fourier transform) output obtained in a radar apparatus, according to an embodiment

FIG. 2(a) is a waveform that illustrates an FFT (fast Fourier transform) output obtained in a radar apparatus, according to an embodiment. The waveform is obtained in the radar apparatus 100 alter performing the coarse detection process. The waveform illustrates a set of peaks at a distance of around 50 m from the radar apparatus 100. However, it is not ascertained if there is one or multiple obstacles located at that distance.

Figure 2B:
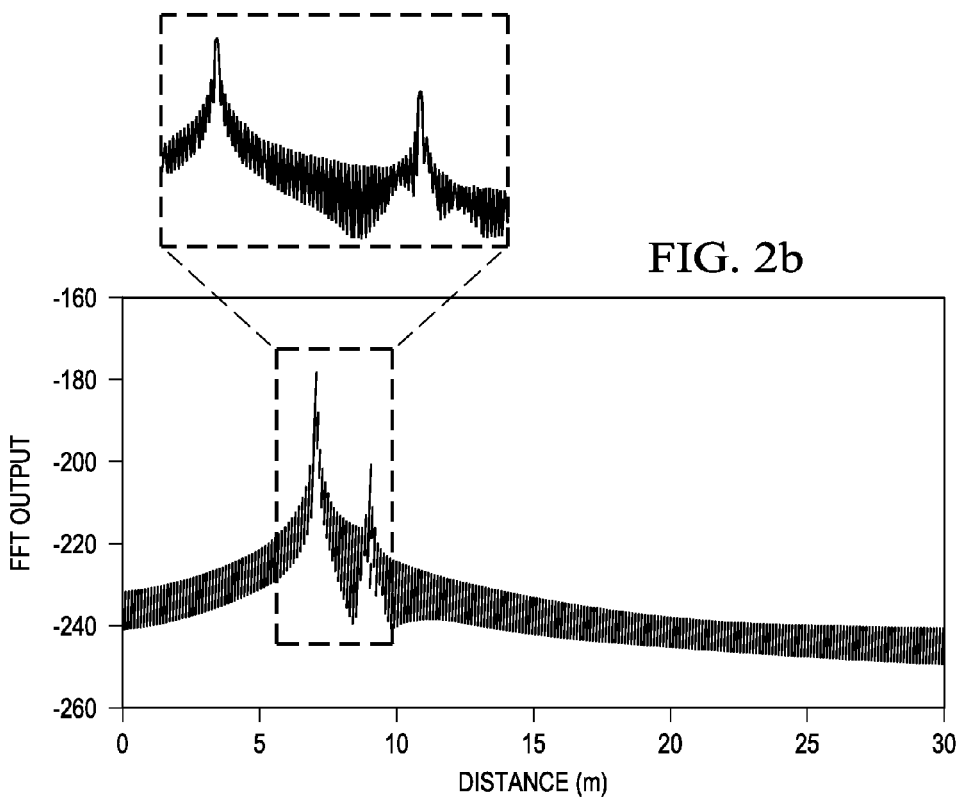
FIG. 2(b) is a waveform that illustrates an FFT output obtained in a radar apparatus, according to an embodiment.

FIG. 2(b) is a waveform that illustrates an FFT output obtained in a radar apparatus, according to an embodiment. The waveform is obtained in the radar apparatus 100 after performing the zoom-in process. The waveform illustrates two separate peaks ascertaining that there are two closely spaced obstacles located at around 50 m from the radar apparatus 100. Thus, when a high slope is used in the zoom-in process it increases a distance resolution of the radar apparatus 100. A high slope in the zoom-in process ensures large frequency separation between closely spaced obstacles. The static frequency shift $\Delta fc_{shift}$ is used to zoom into the obstacles at a specified distance from the radar apparatus 100. Thus, the radar apparatus 100 does not require a sampling frequency of the ADC 114 to be increased or increase in processing requirement of the DSP 116, for high resolution.

Figure 3:
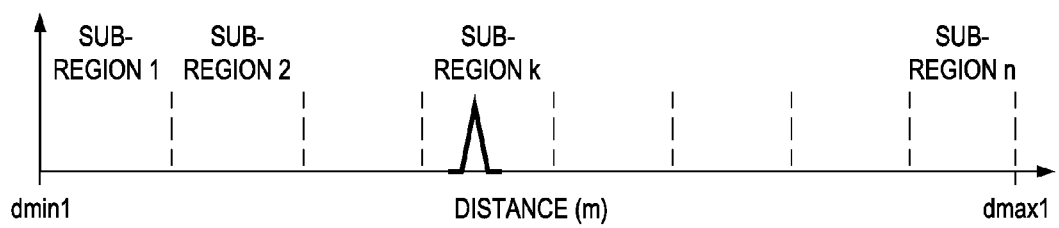
FIG. 3 illustrates a scanning process in a radar apparatus, according to an embodiment.

FIG. 3 illustrates a scanning process in a radar apparatus, according to an embodiment. The scanning process is illustrated in connection with the radar apparatus 100 illustrated in FIG. 1. The scanning process is used when the radar apparatus 100 is required to achieve a high range of resolution in the range of interest. The range of interest is the range between the maximum distance ($d_{max1}$) and the minimum distance ($d_{min1}$). The range of interest is sub-divided into n sub-regions: sub-region 1 through sub-region n.

The DSP 116 determines a set of sub-regions within the range of interest for example scab-region 1, sub-region 2, sub-region k till sub-region n. As an example, the set of sub-regions are illustrated to be contiguous. In another example, the set of sub-regions are non-contiguous. The local oscillator 102 generates a ramp segment corresponding to each sub-region. A slope of each ramp segment generated is equal. The frequency shifter 104 receives a ramp segment corresponding to a sub-region of the set of sub-regions and respectively generates a new transmit signal and a new mixer signal. The frequency shifter 104 provides a defined frequency shift to one of the new transmit signal and the new mixer signal based on the sub-region.

For example, to view an obstacle in the sub-region k, the local oscillator 102 generates a ramp segment with slope Sk and the frequency shifter 104 provides a defined frequency shift $\Delta f_{shift\_k}$. The sub-region k has a range between a maximum distance $d_{max\_k}$ and a minimum distance $d_{min\_k}$. In one example, the defined frequency shift $\Delta f_{shift\_k}$ is obtained from the minimum distance $d_{min\_k}$ of the sub-region k from the radar apparatus 100. In another example, the defined frequency shift $\Delta f_{shift\_k}$ is defined as:

$$\Delta f_{shift\_k} = (Sk*2d_{min\_k})/c \qquad (8)$$

The slope (Sk) is dependent on one or more of the following (but not limited to) the maximum distance ($d_{max\_k}$), the minimum distance ($d_{min\_k}$), a maximum sampling rate ($F_{adc\_max}$) of the ADC 114 and a maximum expected velocity of the one or more obstacles. In one example, the slope Sk is defined as:

$$Sk = \frac{cF_{adc\_max}}{4(d_{max\_k} - d_{min\_k})} \qquad (9)$$

A valid data received by the DSP 116 corresponding to the sub-region k is processed to estimate a distance of one or more obstacles in the sub-region k. Thus, the scanning process in the radar apparatus 100 provides high resolution in the range of interest.

Figure 4:
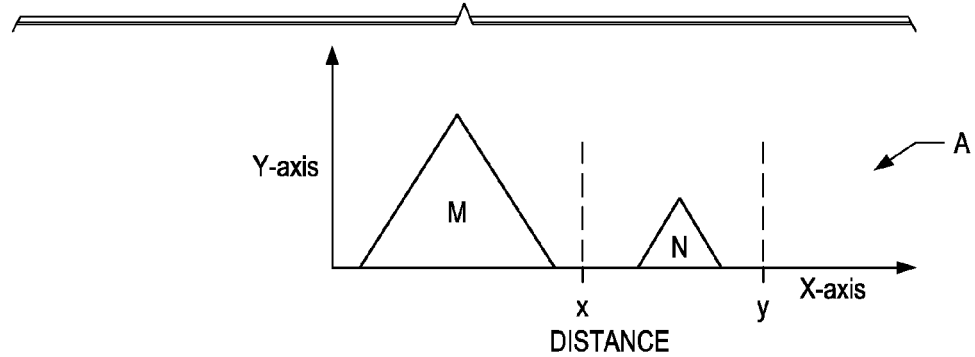
FIG. 4 illustrates a method of mitigating image foldback in a radar apparatus, according to an embodiment.
Figure 4:
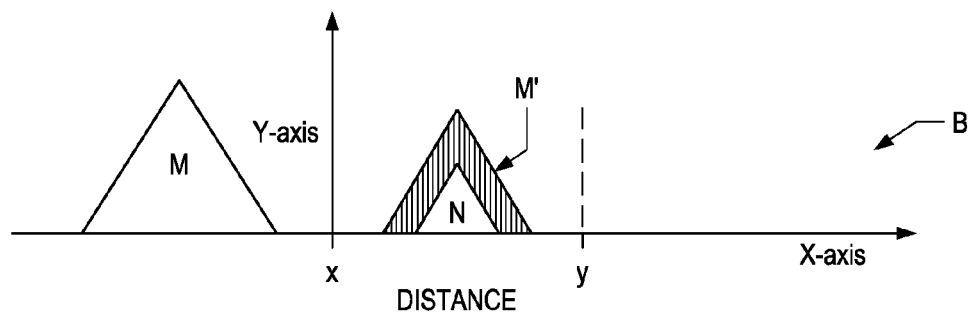
Figure 4:
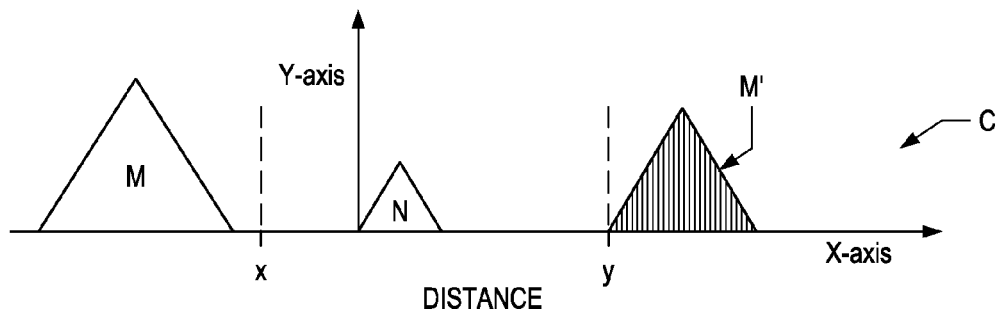

FIG. 4 illustrates a method of mitigating image foldback in a radar apparatus, according to an embodiment. The method is discussed in connection with the radar apparatus 100 illustrated in FIG. 1. The figure illustrates three frequency spectrums A, B, and C. For ease of explanation these frequency spectrums are illustrated with distance (range) on the x axis as there is a linear relationship between IF frequency and distance. The frequency spectrum A is obtained during a coarse detection process in the radar apparatus 100. During the coarse detection process, the local oscillator 102 in the radar apparatus 100 generates a first ramp segment 105 with a slope (S1) and the frequency shifter 104 provides the fixed frequency shift $\Delta f_{shift}$ to one of the transmit signal 107 and the mixer signal 109. The DSP 116 performs frequency domain processing on the corresponding valid data to generate frequency spectrum A. The frequency spectrum A illustrates two obstacles M and N which are detected in the coarse detection process.

Now, the obstacle N is to be viewed with a higher resolution. Therefore, during the zoom-in process, the narrow range of interest is defined as the region between X and Y. During the zoom-in process, the radar apparatus 100 generates the fourth ramp segment with a slope (S2) and the frequency shifter 104 provides the static frequency shift $\Delta fc_{shift}$. The frequency spectrum A is scaled and shifted depending on the slope (S2) and the static frequency shift $\Delta fc_{shift}$. An absolute value of the static frequency shift $\Delta fc_{shift}$ is greater than an absolute value of the fixed frequency shift $\Delta f_{shift}$. An absolute value of the slope (S2) of the fourth ramp segment is greater than an absolute value of the slope (S1) of the first ramp segment 105. The frequency spectrum B is obtained after the zoom-in process is performed in the radar apparatus 100. In frequency spectrum B, the region between X and Y corresponds to the narrow range of interest which is now visible with a higher resolution.

As illustrated in the frequency spectrum B, the obstacle M lies in a negative frequency spectrum because of the static frequency shift $\Delta fc_{shift}$ and the obstacle N lies close to the Y axis. In a complex baseband implementation of the receive chain in the radar apparatus 100, non-idealities related to IQ mismatch causes attenuated images of obstacles in the negative frequency spectrum to foldback onto the positive frequency spectrum. Thus, the frequency components corresponding to the obstacle M create a ghost image M' in the narrow range of interest between X and Y.

As seen in the frequency spectrum B, the ghost image M' completely overlaps the frequency components corresponding to the obstacle N. In one example, the ghost image M' partially overlaps the frequency components corresponding to the obstacle N. This adversely affects the detection and estimation of obstacle N or other objects (or obstacles) in the narrow range of interest between X and Y.

Thus, the radar apparatus 100 adjusts the static frequency shift $\Delta fc_{shift}$ to mitigate the effect of the ghost image M' that is hampering the view of the obstacles in the narrow range of interest between X and Y. In one example, the radar apparatus 100 mitigate the effect of the ghost image M' by providing a predetermined frequency shift to the static frequency shift $\Delta fc_{shift}$ such that the narrow range of interest is shifted by a defined distance. The frequency spectrum C is obtained after the static frequency shift $\Delta fc_{shift}$ is shifted by the predetermined frequency shift. As illustrated, the ghost image M' no longer hampers the view of obstacle N. The DSP 116 in the radar apparatus 100 utilizes data obtained in the coarse detection process to estimate the predetermined frequency shift by which the static frequency shift $\Delta fc_{shift}$ is required to be shifted.

The data obtained in the coarse detection process includes location and signal strength of obstacles such as obstacle M. Additionally, the radar apparatus 100 has information about the attenuation of the ghost images from the parameters of the radar apparatus 100 design such as residual IQ mismatch. This information of the attenuation of ghost images is used by the radar apparatus 100 in determining if the signal strength of the ghost images is substantial to hamper the detection and estimation of the obstacles in the narrow range of interest.

Figure 5:
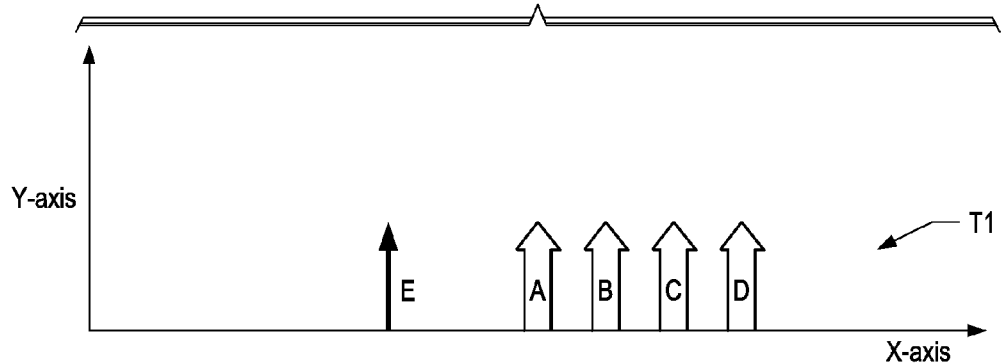
FIG. 5 illustrates a method of mitigating image foldback in a radar apparatus, according to an embodiment.
Figure 5:
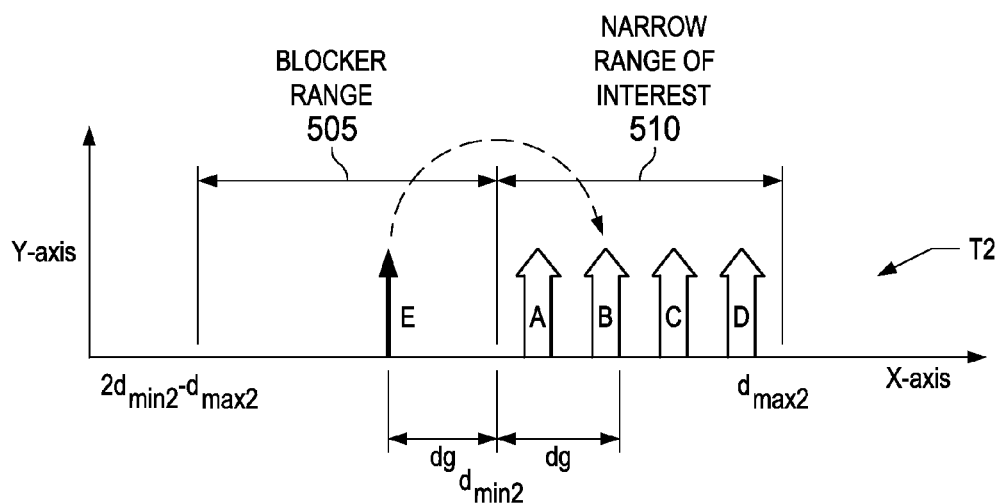
Figure 5:
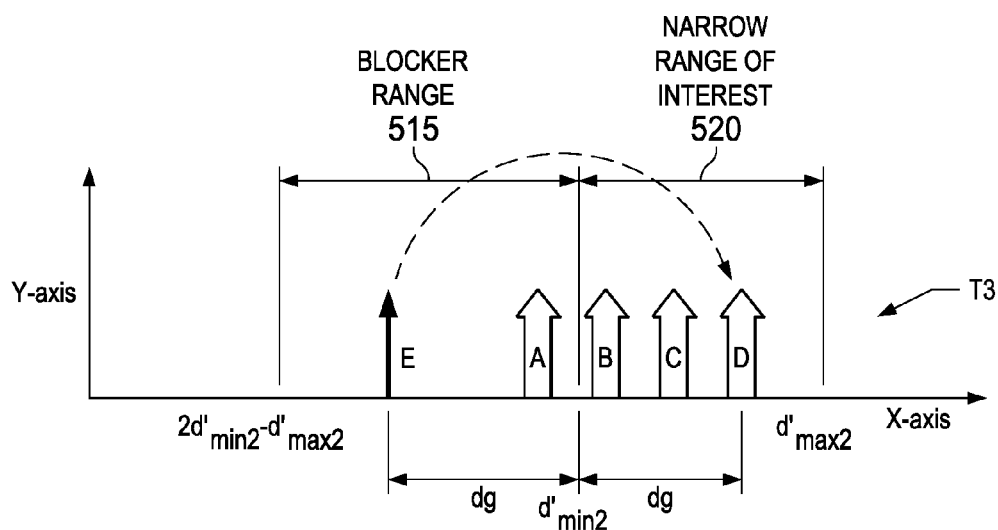

FIG. 5 illustrates a method of mitigating image foldback in a radar apparatus, according to an embodiment. The method is discussed in connection with the radar apparatus 100 illustrated in FIG. 1. The figure illustrates three frequency spectrum T1, T2 and T3. For ease of explanation these frequency spectrums are illustrated with distance (range) on the x axis as there is a linear relationship between IF frequency and distance. The frequency spectrum T1 is obtained during a coarse detection process in the radar apparatus 100.

During the coarse detection process, the local oscillator 102 in the radar apparatus 100 generates a first ramp segment 105 with a slope (S1) and the frequency shifter 104 provides the fixed frequency shift $\Delta f_{shift}$ to one of the transmit signal 107 and the mixer signal 109. The DSP 116 performs frequency domain processing on the corresponding valid data to generate frequency spectrum T1. The frequency spectrum T1 illustrates obstacles B, C, D and E which are detected in the coarse detection process.

In order to view obstacles A, B, C, D in higher resolution, a first narrow range of interest 510 is defined. The first narrow range of interest 510 is a region between $d_{max2}$ and $d_{min2}$. The radar apparatus 100 is configured to view objects in the first narrow range of interest 510 using the zoom-in process (discussed earlier in connection with FIG. 1). This zoom-in process is illustrated in the frequency spectrum T2. An obstacle in a blocker range 505 will hamper or block the detection and estimation of the obstacles in the first narrow range of interest. The blocker range 505 is a region between $(2d_{min2}-d_{max2})$ and $d_{min2}$. An obstacle located at $d_{min2}-\delta$ in the blocker range 505 will have a ghost image with attenuated signal strength at $d_{min2}+\delta$ in the first narrow range of interest 510.

Thus, the obstacle E which is located at distance dg from $d_{min2}$ in the blocker range 505 will have a ghost image with attenuated signal strength at dg from $d_{min2}$ in the first narrow range of interest 510. Thus, the ghost image of obstacle E will hamper the viewing (detection and estimation) of the obstacle B which is located at distance dg from $d_{min2}$ in the first narrow range of interest 510. Hence, this zoom-in process will enable detection and estimation of obstacles A, C and D but not B.

The radar apparatus 100 is configured to again perform a zoom-in process using a second narrow range of interest 520. This zoom-in process is illustrated in the frequency spectrum T3. The second narrow range of interest 520 is $d'_{max2}$ and $d'_{min2}$ which is a shifted version of the first narrow range of interest 510. The blocker range 515 is now between $(2d'_{min2}-d'_{max2})$ and $d'_{min2}$. As a result, the ghost image of obstacle E will not hamper viewing of the obstacle B. Thus, two repetitions of the zoom in process each with a slightly different narrow range of interest enables viewing of all obstacles in the desired narrow range of interest.

A predetermined frequency shift is provided to the static frequency shift such that the first narrow range of interest 510 is shifted by a defined distance to obtain the second narrow range of interest 520. The predetermined frequency shift is based on a location and signal strength of a set of obstacles in a blocker range. For the embodiment illustrated in FIG. 5, the predetermined frequency shift is based on the location and signal strength of the obstacle E.

It is to be noted that the method of mitigating image foldback discussed in connection with FIG. 4 and FIG. 5 is also applicable to the scanning process discussed in connection with FIG. 3. For example, in a case when the range of interest is divided into n contiguous sub-regions of equal length (sub-region 1 through sub-region n), then sub-region (k-1) would define the blocker range for sub-region k. Hence, a data obtained on strength and location of obstacles in sub-region (k-1) would be used in determining the predetermined frequency shift when viewing sub-region k.

Thus, the radar apparatus 100 provides improved detection of obstacles. One or more embodiments discussed above provide a low cost radar that provides high resolution and high range even with lower IF filter bandwidth and a DSP with low processing capabilities.

In the foregoing discussion, the terms "connected" means at least either a direct electrical connection between the devices connected or an indirect connection through one or more passive intermediary devices. The term "circuit" means at least either a single component or a multiplicity of passive or active components, that are connected together to provide a desired function. The term "signal" means at least one current, voltage, charge, data, or other signal. Also, the terms "connected to" or "connected with" (and the like) are intended to describe either an indirect or direct electrical connection. Thus, if a first device is coupled to a second device, that connection can be through a direct electrical connection, or through an indirect electrical connection via other devices and connections. It is to be noted that the terms 'object' and 'obstacle' have been used interchangeably in this disclosure.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A radar apparatus comprising:
   a local oscillator configured to generate a first ramp segment having a first start frequency;
   a frequency shifter configured to receive the first ramp segment and configured to generate a transmit signal and a mixer signal, the frequency shifter configured to provide a fixed frequency shift to one of the transmit signal and the mixer signal based on a range of interest;
   a transmit antenna coupled to the frequency shifter and configured to transmit the transmit signal;
   a receive antenna configured to receive a scattered signal, wherein the transmit signal is scattered by one or more obstacles in the range of interest to generate the scattered signal;
   a mixer configured to receive the scattered signal from the receive antenna and configured to receive the mixer signal from the frequency shifter, the mixer configured to mix the scattered signal and the mixer signal to generate a non-zero IF (intermediate frequency) signal;
an IF filter coupled to the mixer and configured to generate a filtered non-zero IF signal from the non-zero IF signal;
an ADC (analog to digital converter) coupled to the IF filter and configured to sample the filtered non-zero IF signal to generate a valid data; and
a processor coupled to the ADC, the local oscillator and the frequency shifter, the processor configured to process the valid data for estimating a distance of the one or more obstacles in the range of interest.

2. The radar apparatus of claim 1, wherein the range of interest is a range between a maximum distance and a minimum distance.

3. The radar apparatus of claim 2, wherein the minimum distance is non-zero.

4. The radar apparatus of claim 1, wherein the transmit signal is a second ramp segment having a second start frequency and the mixer signal is a ramp segment having the first start frequency, and wherein a difference between the second start frequency and the first start frequency is the fixed frequency shift.

5. The radar apparatus of claim 1, wherein the mixer signal is a third ramp segment having a third start frequency and the transmit signal is a ramp segment having the first start frequency, and wherein a difference between the third start frequency and the first start frequency is the fixed frequency shift.

6. The radar apparatus of claim 5, wherein the fixed frequency shift is obtained from the minimum distance, and wherein a slope of each of the first ramp segment, the second ramp segment and the third ramp segment are equal.

7. The radar apparatus of claim 6, wherein the fixed frequency shift is obtained from the minimum distance and the slope of the first ramp segment.

8. The radar apparatus of claim 6, wherein the slope of the first ramp segment is obtained from at least one of the minimum distance, the maximum distance and a maximum sampling rate of the ADC.

9. The radar apparatus of claim 1, wherein:
the processor is configured to determine a narrow range of interest based on the distance of the one or more obstacles, wherein the narrow range of interest is within the range of interest;
the local oscillator is configured to generate a fourth ramp segment having a fourth start frequency;
the frequency shifter configured to receive the fourth ramp segment and configured to generate a new transmit signal and a new mixer signal, and wherein the frequency shifter is configured to provide a static frequency shift to one of the new transmit signal and the new mixer signal based on the narrow range of interest;
the transmit antenna configured to transmit the new transmit signal;
the receive antenna configured to receive a new scattered signal, wherein the new transmit signal is scattered by the one or more obstacles generate the new scattered signal;
a mixer configured to mix the new scattered signal and the new mixer signal to generate a new non-zero IF signal;
the IF filter configured to generate a new filtered non-zero IF signal from the new non-zero IF signal;
the ADC configured to sample the new filtered non-zero IF signal to generate a new valid data; and
the processor configured to process the new valid data for estimating a distance of the one or more obstacles in the narrow range of interest.

10. The radar apparatus of claim 9, wherein the narrow range of interest is a range between a new maximum distance and a new minimum distance, wherein the new maximum distance is less than the maximum distance and the new minimum distance is greater than the minimum distance.

11. The radar apparatus of claim 9, wherein the new transmit signal is a fifth ramp segment having a fifth start frequency and the new mixer signal is a ramp segment having the fourth start frequency, and wherein a difference between the fifth start frequency and the fourth start frequency is the static frequency shift.

12. The radar apparatus of claim 9, wherein the new mixer signal is a sixth ramp segment having a sixth start frequency and the new transmit signal is a ramp segment having the fourth start frequency, and wherein a difference between the sixth start frequency and the fourth start frequency is the static frequency shift.

13. The radar apparatus of claim 9, wherein an absolute value of a slope of the fourth ramp segment is greater than an absolute value of the slope of the first ramp segment.

14. The radar apparatus of claim 9, wherein an absolute value of the static frequency shift is greater than an absolute value of the fixed frequency shift.

15. The radar apparatus of claim 1, wherein:
the processor is configured to determine a set of sub-regions within the range of interest;
the local oscillator is configured to generate a ramp segment corresponding to each sub-region;
the frequency shifter configured to receive a ramp segment corresponding to a sub-region and configured to generate a new transmit signal and a new mixer signal corresponding to the ramp segment, wherein the frequency shifter is configured to provide a defined frequency shifts to one of the new transmit signal and the new mixer signal based on the sub-region; and
the processor configured to process a valid data obtained corresponding to the sub-region for estimating a distance of the one or more obstacles in the sub-region.

16. The radar apparatus of claim 1, wherein the processor is a digital signal processor (DSP).

17. A method comprising:
generating a first ramp segment having a first start frequency by a local oscillator;
generating a transmit signal and a mixer signal from the first ramp segment;
providing a fixed frequency shift to one of the transmit signal and the mixer signal based on a range of interest;
transmitting the transmit signal;
receiving a scattered signal, wherein the transmit signal is scattered by one or more obstacles in the range of interest to generate the scattered signal;
mixing the scattered signal and the mixer signal to generate a non-zero IF (intermediate frequency) signal;
generating a filtered non-zero IF signal from the non-zero IF signal;
sampling the filtered non-zero IF signal to generate a valid data; and
processing the valid data in a processor for estimating a distance of the one or more obstacles in the range of interest, wherein the range of interest is a range between a maximum distance and a minimum distance.

18. The method of claim 17, wherein the transmit signal is a second ramp segment having a second start frequency and the mixer signal is a ramp segment having the first start frequency, and wherein a difference between the second start frequency and the first start frequency is the fixed frequency shift.

19. The method of claim 17, wherein the mixer signal is a third ramp segment having a third start frequency and the transmit signal is a ramp segment having the first start frequency, and wherein a difference between the third start frequency and the first start frequency is the fixed frequency shift.

20. The method of claim 19, wherein a slope of each of the first ramp segment, the second ramp segment and the third ramp segment are equal.

21. The method of claim 20 further comprising obtaining the fixed frequency shift from the minimum distance and the slope of the first ramp segment.

22. The method of claim 18 further comprising:
determining a narrow range of interest based on the distance of the one or more obstacles, wherein the narrow range of interest is within the range of interest;
generating a fourth ramp segment having a fourth start frequency based on the narrow range of interest, wherein an absolute value of a slope of the fourth ramp segment is greater than an absolute value of the slope of the first ramp segment;
generating a new transmit signal and a new mixer signal from the fourth ramp segment;
providing a static frequency shift to one of the new transmit signal and the new mixer signal based on the narrow range of interest, wherein an absolute value of the static frequency shift is greater than an absolute value of the fixed frequency shift;
transmitting the new transmit signal;
receiving a new scattered signal, wherein the new transmit signal is scattered by the one or more obstacles to generate the new scattered signal;
mixing the new scattered signal and the new mixer signal to generate a new non-zero IF signal;
generating a new filtered non-zero IF signal from the new non-zero IF signal;
sampling the new filtered non-zero IF signal to generate a new valid data; and
processing the new valid data for estimating a distance of the one or more obstacles in the narrow range of interest.

23. The method of claim 22, wherein the new transmit signal is a fifth ramp segment having a fifth start frequency and the new mixer signal is a ramp segment having the fourth start frequency, and wherein a difference between the fifth start frequency and the fourth start frequency is the static frequency shift.

24. The method of claim 22, wherein the new mixer signal is a sixth ramp segment having a sixth start frequency and the new transmit signal is a ramp segment having the fourth start frequency, and wherein a difference between the sixth start frequency and the fourth start frequency is the static frequency shift.

25. The method of claim 22 further comprising mitigating image foldback by providing a predetermined frequency shift to the static frequency shift such that the narrow range of interest is shifted by a defined distance, wherein the predetermined frequency shift is based on a location and a signal strength of a set of obstacles in a blocker range.

26. A method comprising;
generating a first ramp segment having a first start frequency by a local oscillator;
generating a transmit signal and a mixer signal from the first ramp segment;
providing a fixed frequency shift to one of the transmit signal and the mixer signal based on a range of interest;
generating a valid data corresponding to the first ramp segment;
processing the valid data in a processor for estimating a distance of one or more obstacles in the range of interest, wherein the range of interest is a range between a maximum distance and a minimum distance;
determining a narrow range of interest based on the distance of the one or more obstacles, wherein the narrow range of interest is within the range of interest;
generating a fourth ramp segment having a fourth start frequency based on the narrow range of interest by the local oscillator, wherein an absolute value of a slope of the fourth ramp segment is greater than an absolute value of the slope of the first ramp segment;
generating a new transmit signal and a new mixer signal from the fourth ramp segment;
providing a static frequency shift to one of the new transmit signal and the new mixer signal based on the narrow range of interest, wherein an absolute value of the static frequency shift is greater than an absolute value of the fixed frequency shift;
generating a new valid data corresponding to the fourth ramp segment; and
processing the new valid data in the processor for estimating a distance of the one or more obstacles in the narrow range of interest.

* * * * *